(12) United States Patent
Frank et al.

(10) Patent No.: US 6,816,351 B1
(45) Date of Patent: Nov. 9, 2004

(54) THERMAL SHUTDOWN CIRCUIT

(75) Inventors: Richard Frank, Longmont, CO (US);
Denis Michel Darmon, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 26 days.

(21) Appl. No.: 10/230,642

(22) Filed: Aug. 29, 2002

(51) Int. Cl.$^7$ .............................. H02H 5/04; G01K 7/01
(52) U.S. Cl. ...................... 361/103; 361/93.8; 374/163
(58) Field of Search ................................ 361/103, 93.8; 374/101, 163

(56) References Cited

U.S. PATENT DOCUMENTS

| | | | |
|---|---|---|---|
| 4,345,218 A | 8/1982 | Congdon et al. ............ 330/298 |
| 4,497,586 A | * 2/1985 | Nelson ........................ 374/178 |
| 4,667,265 A | 5/1987 | Stanojevic et al. .......... 361/103 |
| 4,669,026 A | 5/1987 | Widlar ........................ 361/103 |
| 4,789,819 A | 12/1988 | Nelson ........................ 323/314 |
| 5,039,878 A | * 8/1991 | Armstrong et al. .......... 307/310 |
| 5,085,526 A | * 2/1992 | Sawtell et al. .............. 374/101 |
| 5,087,894 A | 2/1992 | DeVito et al. ................. 331/66 |
| 5,099,381 A | 3/1992 | Wilcox ........................ 361/103 |
| 5,206,778 A | 4/1993 | Flynn et al. ................. 361/103 |
| 5,267,118 A | 11/1993 | Marshall et al. ............ 361/103 |
| 5,355,123 A | 10/1994 | Nishiura et al. ............ 340/653 |
| 5,359,236 A | 10/1994 | Giordano et al. ........... 307/310 |
| 5,448,174 A | 9/1995 | Gose et al. .................. 327/513 |
| 5,519,354 A | * 5/1996 | Audy .......................... 327/512 |
| 5,737,170 A | 4/1998 | Moyer ......................... 361/103 |
| 5,796,280 A | 8/1998 | Tuozzolo .................... 327/205 |
| 5,838,187 A | 11/1998 | Embree ....................... 327/512 |
| 5,838,578 A | * 11/1998 | Pippin ............................ 716/4 |
| 5,943,203 A | 8/1999 | Wang ............................ 361/75 |
| 5,946,181 A | 8/1999 | Gibson ....................... 361/103 |
| 5,980,106 A | 11/1999 | Yamamoto et al. ......... 374/178 |

OTHER PUBLICATIONS

A. Sedra et al., Microelectronic Circuits, 1987, Holt, Rinehart and Winston, pp. 342–345, 408–410.*

* cited by examiner

*Primary Examiner*—Brian Sircus
*Assistant Examiner*—Z Kitov
(74) *Attorney, Agent, or Firm*—Mark R. Hennings; Merchant & Gould

(57) ABSTRACT

A circuit is arranged to provide a thermal shutdown signal in response to an overtemperature condition. The thermal shutdown circuit is typically implemented in the same die as the circuitry that is to be protected. The thermal shutdown circuit provides a first current in response to a change in temperature when a VBE associated with a transistor decreases below a predetermined level. The first current is mirrored to provide a scaled current. A thermal shutdown signal is activated when the scaled current becomes greater than a reference current. The first current is increased in response to the activated thermal shutdown signal such that the thermal shutdown circuit is deactivated at a temperature that is lower than the temperature at which the circuit is activated. The thermal shutdown circuit is deactivated when the temperature of the die decreases.

22 Claims, 2 Drawing Sheets

US 6,816,351 B1

THERMAL SHUTDOWN CIRCUIT

FIELD OF THE INVENTION

The present invention relates generally to electronic protection circuits, and more particularly to thermal shutdown circuits.

BACKGROUND OF THE INVENTION

Modern electronic circuits contain thermal shutdown circuits for reducing power dissipation and overheating in electronic circuits. An example of such a thermal shutdown circuit 100 is shown in FIG. 1.

FIG. 1 is a schematic of a conventional thermal shutdown circuit (100). The thermal shutdown circuit 100 includes resistors R1 through R5, transistors Q1 through Q5, transistors M1 through M3, and inverters X1 through X3.

Resistor R1 is coupled between node VREG and node N1. An emitter of transistor Q1 is coupled to node N1. A base and a first collector of transistor Q1 is coupled to node N2. A second collector of transistor Q1 is coupled to node N3. A collector of transistor Q2 is coupled to node N2. A base of transistor Q2 is coupled to node VBG. An emitter of transistor Q2 is coupled to node N4. Resistor R2 is coupled between node N4 and a voltage reference such as ground ("ground"). A collector and a base of transistor Q3 are coupled to node N3. An emitter of transistor Q3 is coupled to ground. Resistor R3 is coupled between node VREG and node N5. Resistor R4 is coupled between node N5 and node N6. A collector of transistor Q4 is coupled to node N6. A base of transistor Q4 is coupled to node N3. An emitter of transistor Q4 is coupled to node N7. Resistor R5 is coupled between node N7 and ground. A source of transistor M1 is coupled to node VREG. A drain of transistor M1 is coupled to node N5. A gate of transistor M1 is coupled to node TSH.

An emitter of transistor Q5 is coupled to node VREG. A base of transistor Q5 is coupled to node N6. A collector of transistor QS is coupled to node N8. A drain and a gate of transistor M2 are coupled to node N8. A source of transistor M2 is coupled to ground. A gate of transistor M3 is coupled to node N8. A source of transistor M3 is coupled to ground. A drain of transistor M3 is coupled to current source X11. An input of inverter X1 is coupled to current source X11. An output of inverter X1 is coupled to node N9. An input of inverter X2 is coupled to node N9. An output of inverter X2 is coupled to node N10. An input of inverter X3 is coupled to node N10. An output of inverter X3 is coupled to node TSH.

Transistor Q2 is used to develop a reference current. The reference current is used to set a voltage drop across resistors R3 and R4. Transistor Q5 is turned off (i.e., does not conduct current) when the VBE of transistor Q5 is greater than the voltage drop across resistors R3 and R4. The VBE of transistor Q5 is decreased in response to an increase in temperature. When the VBE of transistor Q5 is equal to the voltage drop across resistors R3 and R4, transistor Q5 is activated and draws a current. Transistor Q5 induces a current in transistor M2, which is reflected in transistor M3. The current flowing through transistor M3 pulls the input of inverter X1 low, which drives the output (TSH) of inverter X3 high. The signal at node TSH is used to turn off circuitry that potentially produces excessive amounts of heat.

SUMMARY OF THE INVENTION

The present invention is directed towards a circuit for providing a thermal shutdown signal in response to an overtemperature condition. The thermal shutdown circuit is typically implemented in the same die as the circuitry that is to be protected. The thermal shutdown circuit provides a first current in response to a change in temperature when a VBE associated with a transistor decreases below a predetermined level. The first current is mirrored to provide a scaled current. A thermal shutdown signal is activated when the scaled current becomes greater than a reference current. The first current is increased in response to the activated thermal shutdown signal such that the thermal shutdown circuit is deactivated at a temperature that is lower than the temperature at which the circuit is activated. The thermal shutdown circuit is deactivated when the temperature of the die decreases.

A more complete appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
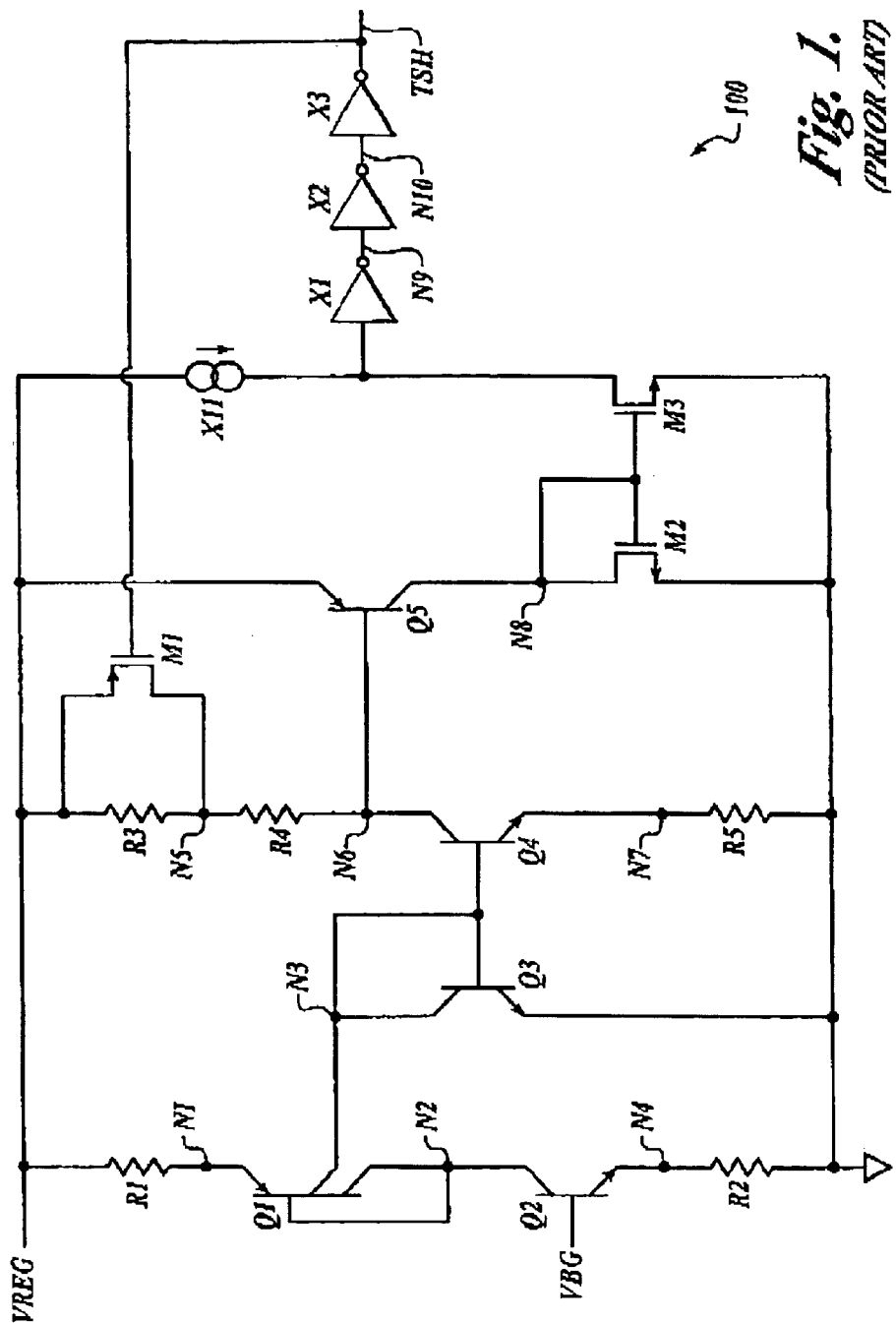
FIG. 1 is a schematic of a conventional thermal shutdown circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items conuected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed towards a circuit for providing a thermal shutdown signal in response to an overtemperature condition. The thermal shutdown circuit is typically implemented in the same die as the circuitry that is to be protected. The thermal shutdown circuit provides a first current in response to a change in temperature when a VBE associated with a transistor decreases below a predetermined level. The first current is mirrored to provide a scaled current. A thermal shutdown signal is activated when the scaled current becomes greater than a reference current. The first current is increased in response to the activated thermal shutdown signal such that the thermal shutdown circuit is deactivated at a temperature that is lower than the temperature at which the circuit is activated. The thermal shutdown circuit is deactivated when the temperature of the die decreases. This configuration provides a high power rejection ratio (i.e., increased noise immunity from power supply fluctuations in a high noise environment) and negligible power consumption of the circuit at room temperature. The thermal shutdown circuit also requires a reduced layout space in an integrated circuit.

Figure 2:
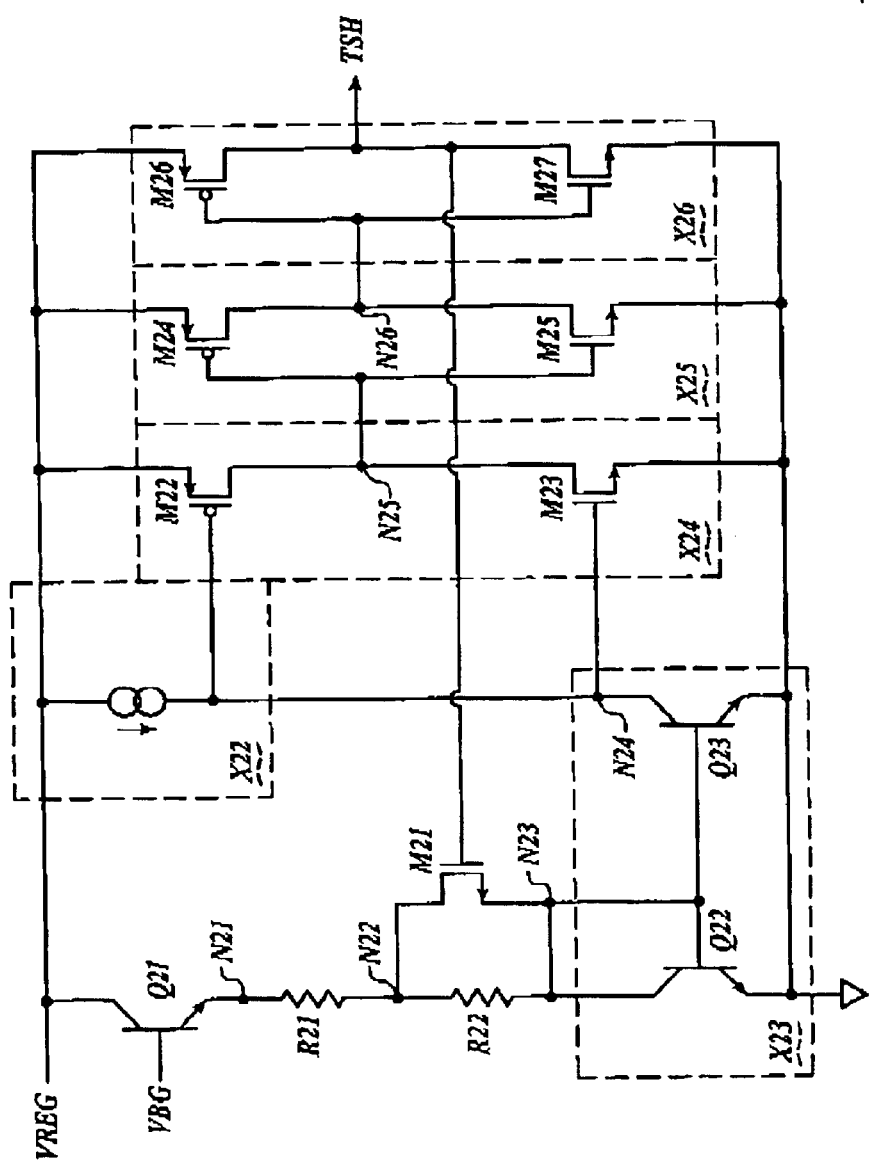
FIG. 2 is a schematic of an example thermal shutdown circuit in accordance with the present invention.

FIG. 2 is a schematic of an example thermal shutdown circuit in accordance with the present invention. As shown in the figure, thermal shutdown circuit 200 includes transistor Q21, resistors R21 and R22, switch M21, current mirror X23, detector X27, and current source X22. Current mirror X23 includes transistors Q22 and Q23. Detector X27 is an inverter circuit that includes inverters X24 through X26. Inverter X24 includes transistors M22 and M23. Inverter X25 includes transistors M24 and M25. Inverter X26 includes transistors M26 and M27.

A collector of transistor Q21 is coupled to node VREG. A base of transistor Q21 is coupled to node VBG. An emitter of transistor Q21 is coupled to node N21. Resistor R21 is coupled between node N21 and node N22. Resistor R22 is coupled between node N22 and node N23. A collector and a base of transistor Q22 are coupled to node N23. An emitter of transistor Q22 is coupled to ground. A base of transistor Q23 is coupled to node N23. An emitter of transistor Q23 is coupled to ground. A collector of transistor Q23 is coupled to node N24. A drain of switch M21 is coupled to node N22. A source of switch M21 is coupled to node N23. A gate of switch M21 is coupled to node TSH.

Current source X22 is coupled between node VREG and node N24. A source of transistor M22 is coupled to node VREG. A gate of transistor M22 is coupled to node N24. A drain of transistor M22 is coupled to node N25. A drain of transistor M23 is coupled to node N25. A gate of transistor M23 is coupled to node N24. A source of transistor M23 is coupled to ground. A source of transistor M24 is coupled to node VREG. A gate of transistor M24 is coupled to node N25. A drain of transistor M24 is coupled to node N26. A drain of transistor M25 is coupled to node N26. A gate of transistor M25 is coupled to node N25. A source of transistor M25 is coupled to ground. A source of transistor M26 is coupled to node VREG. A gate of transistor M26 is coupled to node N26. A drain of transistor M26 is coupled to node TSH. A drain of transistor M27 is coupled to node TSH. A gate of transistor M27 is coupled to node N26. A source of transistor M27 is coupled to node ground.

At room temperature, thermal shutdown circuit 200 is not active and draws substantially no current. An insubstantial amount of current is drawn by leakage of devices in the circuit. In one example, transistors Q21 through Q23 act as temperature sensors. The VBE of transistors Q21 through Q23 in the example is nominally 0.7 V for each transistor at room temperature for transistors made by conventional processes. VBG is a reference voltage such as a bandgap voltage. For example, a bandgap voltage of 1.26 V is applied to node VBG in an example thermal shutdown circuit 200. No current will flow through transistor Q21 and transistor Q22 because the voltage at the base of transistor Q21 is less than the combined VBEs of transistors Q21 and Q22 (e.g., 1.4 V). No current will flow through transistor Q23 because transistor Q23 is configured to mirror the current that flows through transistor Q22. No current will flow from current source X22 because of the high impedances presented at the collector of transistor Q23 and the gates of transistors M22 and M23.

The value of the bandgap reference signal can be selected such that no current is conducted through transistors Q21 through Q23 over a wider range of temperatures. Circuit 200 can operate from a power supply that supplies power at a voltage as low as one volt provided the band gap reference signal is adjusted accordingly (such that transistor Q21 remains biased in the active region).

The input of the first inverter (X24) is pulled high by current source X22 when transistor Q23 is inactive. The output of the first inverter (X24) is low and drives the input of the second inverter (X25), which is a high impedance input. Accordingly, the output of the second inverter (X25) is high. The output of the second inverter (X25) drives the input of the third inverter, which also is high impedance. Accordingly, the output (node TSH) of the third inverter (X26) is low. Inverter X26 acts as a current sink (and not a current source) when the output of inverter X26 is low. Thus, inverter X26 does not source current when thermal shutdown circuit 200 is not active. Accordingly, thermal shutdown circuit 200 draws substantially no current when the circuit (200) is not active.

Thermal shutdown circuit 200 asserts a thermal shutdown signal at node TSH when the temperature of circuit 200 increases beyond a temperature threshold. The temperature threshold is a temperature determined by Equation I, described below. The VBEs of transistors Q21 through Q23 have a negative temperature coefficient and thus the VBEs decrease in response to an increase in temperature of circuit 200. The temperature coefficient of the VBEs of transistors Q21 through Q23 is nominally −2 mV per degree Kelvin. Transistors Q21 through Q23 start to turn on (i.e., conduct current) due to the decreased VBE as the temperature increases towards the temperature threshold. The value of the reference signal may be selected such that no current is conducted through transistors Q21–Q23 below the temperature threshold.

The amount of current flowing through transistors Q21 and Q22 is determined by the values of resistors R21 and P22. The scaling factor of current mirror X23 is determined by the ratio of transistor Q22 to transistor Q23. Thus, the collector current through transistor Q23 increases proportionally in response to the collector current of transistor Q22 and a corresponding increase in temperature. The voltage at node N24 remains high until the level of the collector current through transistor Q23 exceeds the level of the current from current source X22.

The voltage at node N24 rapidly drops to a low value when the temperature of circuit 200 increases beyond the temperature threshold. Current mirror X23 is arranged to absorb (i.e., sink) a current that is greater than the fixed current that is provided by current source X22 when the temperature exceeds the temperature threshold. Thus current mirror X23 provides a load impedance that is less than a source impedance provided by current source X22 when the temperature exceeds the temperature threshold. Inverters X24 through X26 can be designed with high W/L ratios to provide high gain for the signal present at node N25. The transition to low at node N24 is propagated through inverters X24 through X26 resulting in a transition from a low to a high at node TSH. The high value at node TSH can be used to disable circuits. Disabling circuits results in a reduction in power dissipation, which allows the heat of the disabled circuits to dissipate.

Hysteresis in circuit 200 provides different activation and deactivation temperatures. The activation temperature is the temperature at which circuit 200 will activate (i.e., assert) a temperature shutdown signal. The deactivation temperature is the temperature at which circuit 200 will deactivate (i.e., negate) a temperature shutdown signal. The deactivation temperature is selected to be lower than the selected activation temperature.

Different activation and deactivation temperatures (to achieve hysteresis of the threshold temperature) are provided by a feedback loop. The feedback loop provides hysteresis by actuating switch M21 in response to the signal at node TSH. Switch M21 is in a closed position when the value at node TSH goes high. Closing switch M21 effectively provides a short circuit across resistor R22. Switch M21 ideally has a high W/L ratio, which reduces its "on" resistance (i.e., $R_{ds\text{-}on}$). Reducing the on resistance helps switch M21 to more closely resemble an ideal short. Thus, resistor R22 and R21 (combined with switch M21) form a resistive circuit with a selectable resistivity. The total value of the resistance between the emitter of transistor Q21 and collector of transistor Q22 is reduced when switch M21 is closed, which increases the collector current of transistor Q22. The increase in the collector current of transistor Q22 is reflected in the current mirrored by transistor Q23. The rise in the collector current of transistor Q23 lowers the temperature at which the collector current of transistor Q23 and the reference current supplied by current source X22 are equal. Thus, the deactivation temperature is lower than the activation temperature for circuit 200 (which is dependent on both R21 and R22). The deactivation temperature threshold is a temperature determined by Equation II, described below.

In one example, an activated thermal shutdown signal is used to shut down circuits that dissipate power. The heat (from power dissipated by the circuits) typically dissipates through the die package. When the power-dissipating circuits are shut down, the temperature of the die normally falls. This, in turn, lowers the temperature of the thermal shutdown circuit 200. The thermal shutdown circuit (200) is deactivated when the temperature of circuit 200 reaches the lower temperature. As the die temperature decreases, the VBE of transistors Q21 and Q22 begin to rise, which decreases the currents carried by transistors Q21 and Q22. The decrease in the collector current of transistor Q22 is mirrored in transistor Q23. The voltage at sense node N24 increases when the current that is sunk by current mirror X23 is less than the current provided by current source X22. Inverter X24 detects the increased voltage at sense node 24 and toggles the X24 output, which is propagated to node TSH. Thus node TSH is toggled, which deactivates the hysteresis provided by switch.

The activation temperature threshold can be defined as the temperature below which the collector current $I_c$ drops to zero in the temperature sensor. At room temperature and below, circuit 200 does not draw any current and is considered to be "off." As temperature rises to a certain temperature, transistors Q21 and Q22 begin to conduct current. However, circuit 200 is not activated until the voltage at node N24 drops to a low level. In general, the threshold temperature for activation (and deactivation) is a function of a number of parameters, many of which are process- and temperature-dependent.

Assuming VBG is a bandgap reference voltage that is independent of temperature variations, and $$VBE_{Q21} \approx VBE_{Q22} \approx VBE_{Q23} = VBE$$

where the VBE of each transistor is approximately equal and such that the temperature coefficient of each VBE is approximately equal, and $$\beta_{Q21} \approx \beta_{Q22} \approx \beta_{Q23} = \beta$$

where the β of each transistor is approximately equal, and $$Ic_{Q21} \approx Ie_{Q21};\ Ic_{Q22} \approx Ie_{Q22};\ Ic_{Q23} \approx Ie_{Q23}$$

where the collector current is approximately equal to the emitter current in each transistor, and $$\frac{\delta R21}{\delta T} \approx \frac{\delta R22}{\delta T} = \frac{\delta R}{\delta T}$$

where the temperature coefficients of R21 and R22 are approximately equal, and $$\frac{Q22}{Q23} \approx 1$$

where the current ratio of Q22/Q23 is unity, the threshold temperature may be expressed as $$T_1 = T_0 + \frac{VBG - 2VBE_0 - Iref(R21_0 + R22_0)}{Iref(R21_0 + R22_0)\frac{\delta R}{\delta T} + 2\frac{\delta VBE}{\delta T}} \quad (1)$$

where $T_1$ is the threshold temperature of the circuit (in degrees Celsius), $T_0$ is the initial temperature of the circuit (e.g., at room temperature), $VBE_0$ is the VBE of transistors Q21–Q23 at the initial temperature, Iref is the reference current generated by current source X22, $R21_0$ and $R22_0$ are the resistances of R21 and R22 at the initial temperature, $$\frac{\delta R}{\delta T}$$

is the temperature coefficient of resistors R21 and R22, and $$\frac{\delta VBE}{\delta T}$$

is the temperature coefficient of the VBE of transistors Q21–Q23.

When switch M21 is closed (i.e., such that $R_{ds\text{-}on}$ is effectively equal to zero ohms), it effectively shorts resistor R22 to provide a deactivation temperature threshold that is different than the activation temperature threshold. The deactivation temperature threshold may be expressed as $$T_2 = T_0 + \frac{VBG - 2VBE_0 - Iref(R21_0)}{Iref(R21_0)\frac{\delta R}{\delta T} + 2\frac{\delta VBE}{\delta T}} \quad (11)$$

where $T_2$ is the deactivation temperature threshold of the circuit.

To determine the combined values of R21 and P22 at the original temperature, Equation I can be expressed as $$R21_0 + R22_0 = \frac{VBG - 2 \times \left[VBE_0 + \frac{\delta VBE}{\delta T}(T_1 - T_0)\right]}{Iref - \left[1 + \frac{\delta R}{\delta T}(T_1 - T_0)\right]} \quad \text{(III)}$$

To determine the value of R21 at the original temperature, Equation II can be re-expressed as $$R21_0 = \frac{VBG - 2 \times \left[VBE_0 + \frac{\delta VBE}{\delta T}(T_2 - T_0)\right]}{Iref - \left[1 + \frac{\delta R}{\delta T}(T_2 - T_0)\right]} \quad \text{(IV)}$$

In various embodiments the ratio of current mirror X22 may be other than unity. For example, a current mirror ratio of n may be used, which may provide additional noise immunity. A current mirror ratio of n adjusts the effect of Iref in Equation I as $$T_1 = T_0 + \frac{VBG - 2VBE_0 - n \times Iref(R21_0 + R22_0)}{n \times Iref(R21_0 + R22_0)\frac{\delta R}{\delta T} + 2\frac{\delta VBE}{\delta T}} \quad \text{(V)}$$

Likewise, a current mirror ratio of n adjusts the effect of Iref in Equation II as $$T_2 = T_0 + \frac{VBG - 2VBE_0 - n \times Iref(R21_0)}{n \times Iref(R21_0)\frac{\delta R}{\delta T} + 2\frac{\delta VBE}{\delta T}} \quad \text{(VI)}$$

To allow a current ratio of other than unity, Equation III can be re-expressed as $$R21_0 + R22_0 = \frac{VBG - 2 \times \left[VBE_0 + \frac{\delta VBE}{\delta T}(T_1 - T_0)\right]}{n \times Iref - \left[1 + \frac{\delta R}{\delta T}(T_1 - T_0)\right]} \quad \text{(VII)}$$

To allow a current ratio of other than unity, Equation IV can be re-expressed as $$R21_0 = \frac{VBG - 2 \times \left[VBE_0 + \frac{\delta VBE}{\delta T}(T_2 - T_0)\right]}{n \times Iref - \left[1 + \frac{\delta R}{\delta T}(T_2 - T_0)\right]} \quad \text{(VIII)}$$

A current mirror ratio of 10, for example, can be substituted for n in Equations V–VIII.

Other embodiments of the invention are possible without departing from the spirit and scope of the invention. For example, the hysteresis feedback loop may be omitted. The disabled circuitry may be configured to latch the activated thermal shutdown signal and wait a predetermined period before restarting.

In another example current scaling may be used to scale the mirror current to any ratio as long as the current mirror is capable of sinking the sense node current at the threshold temperature.

In another alternative, the value of the reference signal can be selected such that no current is conducted through transistors Q21 and Q23 at room temperature. The degree to which power dissipation characteristics should be matched is dependent upon a performance desired.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A circuit for detecting when a temperature exceeds a temperature threshold, comprising:
   a temperature sensor that includes a control terminal that is coupled to a reference voltage, wherein the temperature sensor is configured to provide a VBE that varies inversely with temperature;
   a resistive circuit that is coupled to a noncontrol terminal of the temperature sensor, wherein the resistive circuit is arranged to select the temperature threshold;
   a current source that is arranged to source a fixed current to a sense node;
   a current mirror that is arranged to sink the fixed current from the sense node in response to the selected temperature threshold; and
   a detector that is arranged to provide an output signal in response to a voltage at the sense node.

2. The circuit of claim 1, wherein the temperature sensor comprises an NPN device, wherein the NPN device has a collector that is coupled to the reference voltage and wherein the NPN device has an emitter that is coupled to the resistive circuit and wherein the NPN device has a base that is coupled to the reference voltage.

3. The circuit of claim 1, wherein the reference voltage is a bandgap voltage.

4. The circuit of claim 1 wherein the resistive circuit is arranged to select between at least one of two resistance levels in response to a feedback signal from an output of the detector.

5. The circuit of claim 1 further comprising a switching circuit that is arranged to bypass a resistive element in the resistive circuit such an overall resistance associated with the resistive circuit is decreased, whereby the temperature threshold is reduced.

6. The circuit of claim 1 wherein the current mirror comprises a pair of bipolar transistors that are configured to operate as the current mirror.

7. The circuit of claim 1 wherein the detector is an inverter circuit.

8. The circuit of claim 1 wherein the current mirror is arranged to provide a load impedance that is less than a source impedance provided by the current source when the temperature exceeds a predetermined level.

9. The circuit of claim 1 wherein the circuit substantially draws no current when the reference voltage is less than the sum of a VBE of the temperature sensor and a VBE of a first transistor in the current mirror, wherein the first transistor has a base and a collector that are coupled to the resistive circuit.

10. A circuit for detecting when a temperature exceeds a temperature threshold, comprising:
    means for initiating a first current from the temperature sensor when the VBE of the temperature sensor decreases below a predetermined level, wherein the predetermined level is determined by the reference signal;
    means for coupling the first current through a resistive circuit such that the resistive circuit determines the temperature threshold;
    means for coupling the first current to a current mirror;
    means for sinking a second current, wherein the second current is related to the first current by the current mirror;

means for sourcing a source current to a sense node; and means for detecting a change in voltage at the sense node when the source current is absorbed by the current mirror.

11. The circuit of claim 10, further comprising means for selecting between at least one of two resistive levels of the resistive circuit in response to the detection of the change of the sense node voltage.

12. The circuit of claim 10, further comprising a switching circuit to bypass a resistive element in a resistive circuit whereby the overall resistance of the resistive circuit is lowered and whereby the temperature threshold is reduced.

13. The circuit of claim 10, wherein the current mirror comprises bipolar transistors.

14. The circuit of claim 10, wherein the temperature sensor comprises an NPN device.

15. A method for detecting when a temperature exceeds a temperature threshold, comprising:

applying a reference signal to a control terminal of a temperature sensor, wherein the temperature sensor has an associated VBE that has a negative temperature coefficient;

initiating a first current from the temperature sensor when the VBE of the temperature sensor decreases below a predetermined level, wherein the predetermined level is determined by the reference signal;

coupling the first current through a resistive circuit such that the resistive circuit determines the temperature threshold;

coupling the first current to a current mirror;

sinking a second current, wherein the second current is related to the first current by the current mirror;

sourcing a source current to a sense node; and detecting a change in voltage at the sense node when the source current is absorbed by the current mirror.

16. The method of claim 15, further comprising selecting between at least one of two resistive levels of the resistive circuit in response to the detection of the change of the sense node voltage.

17. The method of claim 16, further comprising using a switching circuit to bypass a resistive element in the resistive circuit whereby the overall resistance of the resistive circuit is lowered and whereby the temperature threshold is reduced.

18. The method of claim 15, further comprising using bipolar transistors in the current mirror.

19. The method of claim 15, further comprising using an inverter for the detector.

20. The method of claim 15, further comprising using an NPN device for the temperature sensor.

21. A circuit for detecting when a temperature exceeds a temperature threshold, comprising:

a temperature sensor that includes a control terminal that is coupled to a reference voltage, wherein the temperature sensor is configured to provide a VBE that varies inversely with temperature;

a resistive circuit that is coupled to a noncontrol terminal of the temperature sensor, wherein the resistive circuit is arranged to select the temperature threshold;

a current source that is arranged to source a fixed current to a sense node such that the current source does not source current during normal operating conditions, wherein the normal operating conditions include operating at a temperature that is below the temperature threshold;

a current mirror that is arranged to sink the fixed current from the sense node in response to the selected temperature threshold; and a detector that is arranged to provide an output signal in response to a voltage at the sense node.

22. The circuit of claim 21, wherein the current mirror is further arranged to neither source nor sink current during the normal operating conditions.

* * * * *